Patented Jan. 14, 1936

2,028,116

UNITED STATES PATENT OFFICE 2,028,116

BENZANTHRONE SELENAZOLE AND PROCESS OF PREPARING THE SAME

Alexander J. Wuertz, Carrollville, and Myron S. Whelen, Milwaukee, Wis., assignors to E. I. du Pont de Nemours & Company, Wilmington, Del., a corporation of Delaware No Drawing. Application April 29, 1933, Serial No. 668,621

13 Claims. (Cl. 260—44)

This invention relates to selenium compounds of the benzanthrone series. It is an object of this invention to prepare novel organic compounds which are useful as intermediates for dyestuffs. Other and further objects of this invention will appear as the description proceeds.

The compounds with which this invention deals are characterized by possessing in their structure both a benzanthrone configuration and a selenazole ring. They are represented generally by the formula:

$$R \underset{(\beta) \diagdown N}{\overset{(\alpha) \diagup Se}{\diagdown}} CX$$

wherein R stands for the divalent residue of a benzanthrone and X stands for hydrogen, alkyl or aryl. We shall hereinafter refer to these compounds generally as $\alpha,\beta$-benzanthrone-selenazoles, the positions $\alpha$, $\beta$ designating the attachment of the Se and N atoms repectively in the anthraquinone nucleus.

Typical examples of the above compounds are $\alpha,\beta$-benzanthrone-selenazole, $\alpha,\beta$-benzanthrone-methyl-selenazole, $\alpha,\beta$-benzanthrone-phenyl-selenazole and their substitution derivatives. We have found that these compounds form valuable intermediates for the manufacture of novel vat dyestuffs of the dibenzanthrone or isodibenzanthrone series. Thus by fusing an intermediate of the above series with alkali, a selenium containing dyestuff of the dibenzanthrone series is obtained. If, on the other hand, the intermediate is first halogenated and then subjected to fusion, an isodibenzanthrone compound is obtained. The halogenation evidently introduces a halogen atom in the Bz1-position of the benzanthrone nucleus, causing the subsequent fusion to produce an isodibenzanthrone compound instead of a dibenzanthrone.

We prepare our novel compounds by starting with an anthraquinone-1,2-selenazole as initial material. This in turn may be obtained by reacting a 2,2'-diamino-1,1'-dianthraquinonyl-diselenide with an aldehyde. (See copending application of Perkins and Bishop, Ser. No. 627,223.) This initial material is then reduced in concentrated sulfuric acid and reacted either simultaneously or subsequently with glycerine to form a benzanthrone compound. It will be clear from the method of preparation that the final product may have a structure corresponding to one of the following three formulas:

(1, 2, 4, 10)   (1, 2, 5, 10)   (1, 2, 8, 9)

It is uncertain, however, which one of the three is the correct formula, or whether indeed the product is not a mixture of the three or any two of them.

Without limiting our invention to any particular procedure, the following examples are given to illustrate our specific mode of operation. Parts are by weight.

*Example 1.—Benzanthrone-1,2-C-phenyl-selenazole*

10 parts of anthraquinone-1,2-C-phenyl-selenazole (prepared by the action of benzaldehyde on 2,2'-diamino-anthraquinone diselenide; see Example 8 below) are dissolved in 100 parts of concentrated sulfuric acid (66° Bé.), and sufficient water is added thereto to reduce the concentration of the sulfuric acid to about 82%. The reaction mass is then heated to 112–115° C. and at this temperature 9 parts of glycerol and 3.5 parts of ground iron are simultaneously added over a period of three hours. The temperature is then raised to 118° C. and maintained for one hour. If the reaction is still incomplete, 1 part of additional glycerol and 0.5 part of iron are added simultaneously over a period of one hour at 118–120° C. When complete benzanthrone formation has taken place the mass is cooled to 80° C. and poured into a large volume of water and heated at 80° C. for one hour. It is then filtered, and the filter cake is washed acid free with water. This product is then suspended in approximately 500 parts of water containing sufficient caustic alkali to keep the suspension alkaline after heating for 2 hours at 90–100° C. and heated at 90–100° C. for 2 hours. It is then filtered, washed with water until free of alkali, and dried. The benzanthrone-phenyl-selenazole so obtained is a brownish-yellow powder, which on dissolving in concentrated sulfuric acid gives an orange-red coloration with a yellow fluorescence. It dyes cotton in weak yellow shades.

*Example 2.—Benzanthrone-1,2-C-methyl-selenazole*

10 parts of anthraquinone-1,2-C-methyl-selenazole (prepared by the action of acetaldehyde or paraldehyde on 2,2'-diamino-anthraquinone-diselenide; see Example 9 below) are dissolved in 100 parts of concentrated sulfuric acid (66° Bé.), and sufficient water is added thereto to reduce the concentration of the sulfuric acid to about 82%. The reaction is then heated to 112–115° C., and at this temperature 9 parts of glycerol and 3.5 parts of ground iron are simultaneously added at a uniform rate over a period of three hours. The reaction mass is then heated to 118° C. and this temperature is maintained one hour. The benzanthrone-methyl-selenazole so formed is then isolated in a manner analogous to that of the benzanthrone-phenyl-selenazole in Example 1. The product so obtained is a brownish-yellow powder which on dissolving in concentrated sulfuric acid gives an orange-red coloration with yellow fluorescence.

*Example 3.—Benzanthrone-1,2-selenazole*

10 parts of anthraquinone-1,2-selenazole (prepared by the action of formaldehyde or trioxymethylene on 2,2'-diamino-anthraquinone-diselenide; see Example 9 below) are dissolved in 100 parts of concentrated sulfuric acid (66° Bé.) and sufficient water is added thereto to reduce the concentration of the sulfuric acid to 82%. The mass is then heated under agitation to 112–115° C. and at this temperature over a period of three hours 8.5 parts of glycerol and 3.5 parts of powdered iron are simultaneously added at a uniform rate. The temperature is then raised to 118–120° C. and this temperature is maintained for a further period of one hour. The completed reaction is then cooled to about 80° C. and poured into a large volume of water. The benzanthrone-1,2-selenazole so formed is isolated in a manner similar to that used for the isolation of benzanthrone-1,2-phenyl-selenazole shown in Example 1. The material so obtained on dissolving in concentrated sulfuric acid gives an orange-red coloration with strong yellow fluorescence.

*Example 4.—Benzanthrone-1,2-C-β-anthraquinone-selenazole*

10 parts of anthraquinone-1,2-C-β-anthraquinone-selenazole:

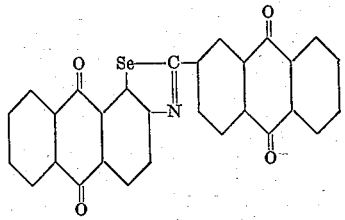

(see Example 8 below) are dissolved in 130 parts of concentrated sulfuric acid (66° Bé.) and sufficient water is added to reduce the concentration of the sulfuric acid to about 82%. The reaction mass is then heated to 112–115° C. and at this temperature 9 parts of glycerol and 3.5 parts of ground iron are simultaneously fed in over a period of three hours. The temperature is then raised to 118° C. and maintained at this value for a further period of about one hour. The benzanthrone-1,2-C-β-anthraquinonyl-selenazole is isolated in a manner analogous to that shown in Example 1. It is a greenish-yellow powder which on dissolving in concentrated sulfuric acid gives an orange-red color with yellow fluorescence.

*Example 5.—Benzanthrone-1,2-C-phenyl-selenazole*

10 parts of anthraquinone-1,2-C-phenyl-selenazole are dissolved in 100 parts of concentrated sulfuric acid (66° Bé.) and 2.5 parts of precipitated copper powder are added. The reaction mass is then heated under agitation to 40° C. and maintained at a temperature of 40–50° C. for about six hours or until the copper has all disappeared. It is then filtered and the filtrate is diluted with a sufficient quantity of water to reduce the acid concentration to about 82%. It is then heated to 112–115° C. and 9 parts of glycerol are added at this temperature at a uniform rate over a period of three hours. The temperature is then raised to 118–120° C. and the whole is heated for a further period of one hour. The benzanthrone-1,2-C-phenyl-selenazole is then isolated in a manner similar to that shown in Example 1.

In an analogous manner to the above examples, substituted α,β-benzanthrone-selenazoles may be prepared by starting with the correspondingly substituted anthraquinone-1,2-selenazoles. Alternatively, certain substituents may be introduced into the final products by well known chemical operations, such as halogenation, nitration, sulfonation or oxidation. The effect here is generally analogous to that of carrying out the same operation on ordinary benzanthrone. For instance, oxidation leads first to a dibenzanthronyl compound and then to a dihydroxy-dibenzanthronyl compound. Monochlorination enters chlorine into the Bz1-position, while more intense chlorination introduces further chlorine, most probably in the anthraquinone nucleus. The following examples will illustrate the process of introducing halogen into the Bz1-position.

*Example 6.—Bz1-bromo-benzanthrone-1,2-C-phenyl-selenazole*

10 parts of benzanthrone-1,2-C-phenyl-selenazole as obtained in Example 1 are first finely subdivided by dissolving in 100 parts of concentrated sulfuric acid (66° Bé.) and reprecipitating in a large volume of water, filtering and washing with water until free of acid. This material is then suspended in 500 parts of cold water and thereto are added, below the surface of the liquid, 5 parts of liquid bromine. The reaction is most conveniently carried out in a closed vessel. The mass is agitated for sixteen hours at room temperature; it is then heated to 70° C. and held at this temperature for one hour. The Bz1-bromo-benzanthrone-1,2-C-phenyl-selenazole is then isolated by filtration. It is washed free of acid with water and dried. It is a yellow compound, which on dissolving in concentrated sulfuric acid gives a cherry red coloration.

Example 7.—Bz1-chloro-benzanthrone-1,2-C-phenyl-selenazole 10 parts of benzanthrone-1,2-C-phenyl-selenazole are finely subdivided as in Example 6 and then suspended in 500 parts of water. The mass is heated to 60° C. and a stream of chlorine gas is passed in, until a total weight corresponding to one atom of chlorine has been absorbed into the benzanthrone-1,2-C-phenyl-selenazole molecule. The Bz1-chloro-benzanthrone-1,2-C-phenyl-selenazole is then isolated by filtration, washed and dried.

It is a yellow powder, which on dissolving in concentrated sulfuric acid gives a red coloration.

The initial materials used in Examples 1 to 5 above are prepared from 2-amino-anthraquinone-1-selenol, or the corresponding diselenide, and the corresponding aldehyde. The following examples will serve to illustrate our preferred mode of operation.

Example 8.—Anthraquinone-1,2-C-β-anthraquinonyl-selenazole 10 parts of 2-amino-1-anthraquinone-selenol or an equal weight of 2,2'-diamino-dianthraquinonyl-diselenide are dissolved in 100 parts of concentrated sulfuric acid (66° Bé.) and 10 parts of anthraquinone-β-aldehyde are added thereto at a temperature of 25—50° C. Sulfur dioxide is evolved. The reaction mass is then heated to 70° C. over a short period of time and then cooled to about 40° C. Sufficient water is slowly added until the anthraquinone-1,2-C-β-anthraquinonyl-selenazole crystallizes out, which occurs at an acid concentration of about 75%. The precipitate is then filtered off, washed with 75% sulfuric acid, heated up in water, filtered, and washed acid free. The anthraquinone-1,2-anthraquinonyl-thiazole so formed is greenish-yellow in color and dissolves in concentrated sulfuric acid with a yellow color.

If in lieu of 10 parts of anthraquinone-aldehyde, 6 parts of benzaldehyde are used, the rest of the procedure remaining the same, anthraquinone-1,2-C-phenyl-selenazole is obtained.

Example 9.—Anthraquinone-1,2-selenazole 10 parts of 2-amino-1-anthraquinone-selenol or an equal weight of 2,2'-diamino-dianthraquinonyl-diselenide are dissolved in 100 parts of concentrated sulfuric acid (66° Bé.) and 1.5 parts of trioxy-methylene are added thereto at a temperature of 25—50° C. Sulfur dioxide is evolved. The reaction mass is then heated to 70° C. over a short period of time and then cooled to about 40° C. Sufficient water is slowly added until the anthraquinone-1,2-selenazole crystallizes out, which occurs at an acid concentration of about 75%. The precipitate is then filtered off, washed with 75% sulfuric acid, heated up in water, filtered, and washed acid free. The anthraquinone-1,2-selenazole so formed is greenish-yellow in color and dissolves in concentrated sulfuric acid with a yellow color.

If in lieu of 1.5 parts of trioxy-methylene, 3 parts of paraldehyde or acetaldehyde are used, the rest of the procedure remaining the same, anthraquinone-1,2-methyl-selenazole is obtained.

It will be understood that many variations and modifications are possible in our preferred mode of operation without departing from the spirit of this invention.

We claim:

1. A compound of the general formula:

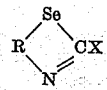

wherein R stands for a divalent benzanthrone radical to which the S and N are connected in the α and β positions respectively while X stands for hydrogen, alkyl or aryl.

2. An α,β-benzanthrone-selenazole.
3. An α,β-benzanthrone-C-phenyl-selenazole.
4. α,β-benzanthrone-C-phenyl-selenazole.
5. A Bz1-halogen-α,β-benzanthrone-selenazole.
6. Bz1-halogen-α,β-benzanthrone-C-phenyl-selenazole.
7. The process of producing a selenium compound of the benzanthrone series which comprises reducing an anthraquinone-1,2-selenazole which contains no substituent in the remaining alpha positions and reacting the same with glycerol in the presence of concentrated sulfuric acid.
8. The process of producing a selenium compound of the benzanthrone series which comprises reducing an anthraquinone-1,2-selenazole which contains no substituent in the remaining alpha positions by the aid of a reducing metal in concentrated sulfuric acid, adding glycerol and heating until benzanthrone formation is complete.
9. The process of producing a selenium compound of the benzanthrone series which comprises reacting an α,β-anthraquinone-selenazole which contains no substituent in the remaining alpha position simultaneously with a reducing metal and glycerol in concentrated sulfuric acid.
10. The process of producing a selenium compound of the benzanthrone series which comprises reacting an α,β-anthraquinone-selenazole which contains no substituent in the remaining alpha positions with a reducing metal and glycerol in concentrated sulfuric acid to form a benzanthrone compound, recovering the latter and subjecting the same to an operation selected from the group consisting of halogenation, nitration, and sulfonation.
11. The process of producing a selenium compound of the benzanthrone series which comprises reacting an α,β-anthraquinone-selenazole which contains no substituent in the remaining alpha positions with a reducing metal and glycerol in concentrated sulfuric acid to form a benzanthrone compound, recovering the latter and subjecting the same to halogenation whereby to introduce halogen in the Bz1-position.
12. The process of producing an α,β-benzanthrone-C-phenyl-selenazole which comprises reacting a 1,2-anthraquinone-C-phenyl-selenazole which contains no substituent in the remaining alpha positions with a reducing metal and glycerine in concentrated sulfuric acid.
13. The process of producing a Bz1-halogen-α,β-benzanthrone-C-phenyl-selenazole which contains no substituent in the remaining alpha positions which comprises reacting a 1,2-anthraquinone-C-phenyl-selenazole with a reducing metal and glycerine in concentrated sulfuric acid, recovering the product and subjecting the same to halogenation whereby to introduce one halogen atom.

ALEXANDER J. WUERTZ.
MYRON S. WHELEN.